(12) United States Patent
Kamman

(10) Patent No.: US 12,036,907 B2
(45) Date of Patent: Jul. 16, 2024

(54) VOICE AND MANUALLY POWERED RETRACTABLE AUTOMOBILE CUP HOLDER

(71) Applicant: Kenneth Kamman, Bloomfield, MI (US)

(72) Inventor: Kenneth Kamman, Bloomfield, MI (US)

( * ) Notice: Subject to any disclaimer, the term of this patent is extended or adjusted under 35 U.S.C. 154(b) by 0 days.

(21) Appl. No.: 17/943,016

(22) Filed: Sep. 12, 2022

(65) Prior Publication Data

US 2024/0083326 A1    Mar. 14, 2024

(51) Int. Cl.
*B60N 3/10*    (2006.01)
*B60R 16/037*    (2006.01)

(52) U.S. Cl.
CPC .......... *B60N 3/102* (2013.01); *B60R 16/0373* (2013.01)

(58) Field of Classification Search
CPC ............................ B60N 3/102; B60R 16/0373
USPC ................................... 248/311.2; 108/25, 26
See application file for complete search history.

(56) References Cited

U.S. PATENT DOCUMENTS

| | | | | |
|---|---|---|---|---|
| 477,987 A * | 6/1892 | Brandon | ................. | A47F 5/005 108/26 |
| 1,910,091 A * | 5/1933 | Collier | ................ | A24F 19/0092 108/26 |
| 2,574,250 A * | 11/1951 | Dalton | ................... | B60N 3/102 248/242 |
| 3,606,112 A * | 9/1971 | Cheshier | ................ | B60N 3/102 312/246 |
| 4,724,986 A * | 2/1988 | Kahn | ....................... | B60N 3/18 224/567 |
| 5,070,795 A * | 12/1991 | Redlin | ................... | A47B 13/16 108/26 |
| 5,106,003 A * | 4/1992 | Ma | ......................... | B60N 3/002 224/567 |
| 5,280,848 A * | 1/1994 | Moore | ..................... | B60R 7/04 220/846 |
| 5,642,843 A * | 7/1997 | Leivan | .................. | B60N 3/102 224/281 |
| 7,147,259 B2 * | 12/2006 | Radu | ....................... | B60N 2/75 224/537 |
| 7,648,114 B2 * | 1/2010 | Akerstedt | .............. | B60N 3/105 296/70 |
| 10,023,091 B2 * | 7/2018 | Bendewald | ............ | B60N 3/001 |
| 10,787,129 B2 * | 9/2020 | Qin | .......................... | B60R 7/04 |
| 11,346,522 B2 * | 5/2022 | Kamman | ................ | F21S 43/27 |

(Continued)

FOREIGN PATENT DOCUMENTS

DE    102014113860 A1 *    3/2016    .......... B60N 2/0228

*Primary Examiner* — Jonathan Liu
*Assistant Examiner* — Guang H Guan

(57) ABSTRACT

A cup holder assembly configured to be attached to an instrument panel of a vehicle without altering the instrument panel of the vehicle. The cup holder assembly comprises a cup holder configured to automatically rotate between a first position retracted under the instrument panel of the vehicle and a second position rotated outward from under the instrument panel of the vehicle for holding cups, upon flipping a manually controlled electronic switch or upon an activation of a voice activated control module by voice commands. The cup holder assembly is configured to be removed from the instrument panel without leaving any sign of installation, thereby maintaining authenticity of the vehicle.

20 Claims, 4 Drawing Sheets

(56) References Cited

U.S. PATENT DOCUMENTS 11,491,919 B2 * 11/2022 Westfall .................. B60R 7/046
2024/0083326 A1 * 3/2024 Kamman ............ B60R 16/0373

* cited by examiner

VOICE AND MANUALLY POWERED RETRACTABLE AUTOMOBILE CUP HOLDER

BACKGROUND OF THE INVENTION

1. Field of the Invention

The present invention relates to a retractable cup holder for a motor vehicle, boat or home use. More specifically, this invention involves a cup holder whereby the initial design intent was for it to be stowed under a vehicle instrument panel and automatically rotate outward to conveniently secure cups with beverages. The cup holder is powered outward with an audible voice command or the operation of a switch and can subsequently retract out of the way back under the vehicle instrument panel. Although this invention can be utilized for many motor vehicles, the application of this invention is intended for older vintage and antique motor vehicles but can also be adapted for other applications such as in a boat or home use.

2. Prior Background

Motor vehicles did not have cup holders until the introduction of Chrysler's 1984 Plymouth Voyager Mini-Van. There are hundreds of thousands of older motor vehicles registered today which do not have a cup holder. After market cup holders today require vehicle modification for installation and then manual operation for use. Vehicle modifications for these requires removing componentry, cutting or drilling for installation. This invention allows for a powered retractable cup holder without any defacement to the vehicle. There is no cutting, welding, drilling or component removal to install this invention. The cup holder automatically moves out from under the instrument panel for use with the flip of a switch or with hands free voice activation and then can be rotated out of the way after use. It can be easily removed from the vehicle, if desired, without any sign of its original installation.

DETAILED DESCRIPTION OF THE PREFERRED EMBODIMENTS

Referring to FIG. 1, the Voice and Manually Powered Retractable Automobile Cup Holder invention is shown with all the vehicle embodiments involved. Shown in the FIG. 1. diagram is a power source 1 which supplies 6 volts DC or 12 volts DC power 2 to a Manual Throw Switch 3 and a Voice Activated Control Module both mounted under the vehicle instrument panel. The Switch 3 and Voice Activated Switch 5 both provide power 4 to a Linear Actuator 6 which is attached to vehicle Support Structure 9 on one end and an Actuating Rod 8 on the other end. The Linear Actuator 6 when powered by Switch 3 or 5 moves the Actuating Rod 6 of which its other end is attached to Cup Holder 7 and rotates Cup Holder 7 out from under the vehicle instrument panel to allow usage. The Linear Actuator 6 together with Cup Holder 7 are both attached to Support Structure 9 which is a single point attachment under the vehicle instrument panel. The attachment can be any rigid structural component with existing holes or attachment points.

Referring to FIG. 2, shown is the top view and side (rear) view of the operating geometry of the invention. The Cup Holder pivots about a fixed point rigidly attached to the vehicle Support Structure. The Actuator is also attached to the same vehicle Support Structure. An actuating rod which is attached to the actuating end of the linear actuator rotates the Cup Holder about its pivot point moving the Cup Holder out from under the instrument panel for usage. The Single Throw Switch or the choice of voice control, where the Voice Activated Control Module also switches power to the Actuator, allowing the Cup Holder to rotate out and in.

Referring to FIG. 3, shown is a schematic of the electronic operation of the invention. The wiring diagram depicts how the Single Throw Switch and the Voice Activated Control Module provides reversible power to the Actuator. The two Relays shown in the schematic reverse the polarity controlling two-way movement of the Actuator.

Referring to FIG. 4, shown is an illustration of a vehicle instrument panel with the cup holder swung outward for usage.

BRIEF DESCRIPTION OF THE DRAWINGS

The preferred embodiments of the invention are disclosed in the following description and in the accompanying drawings, wherein.

SUMMARY OF THE INVENTION

Figure 1:
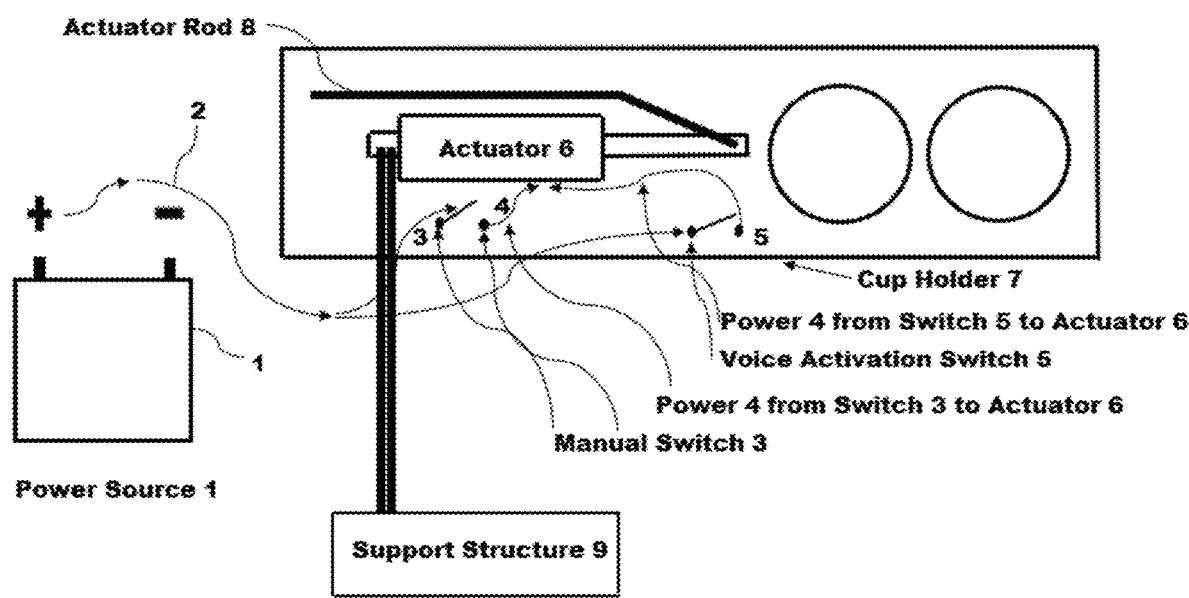
FIG. 1. is a schematic diagram of all the vehicle embodiments involved in the invention.
Figure 2:
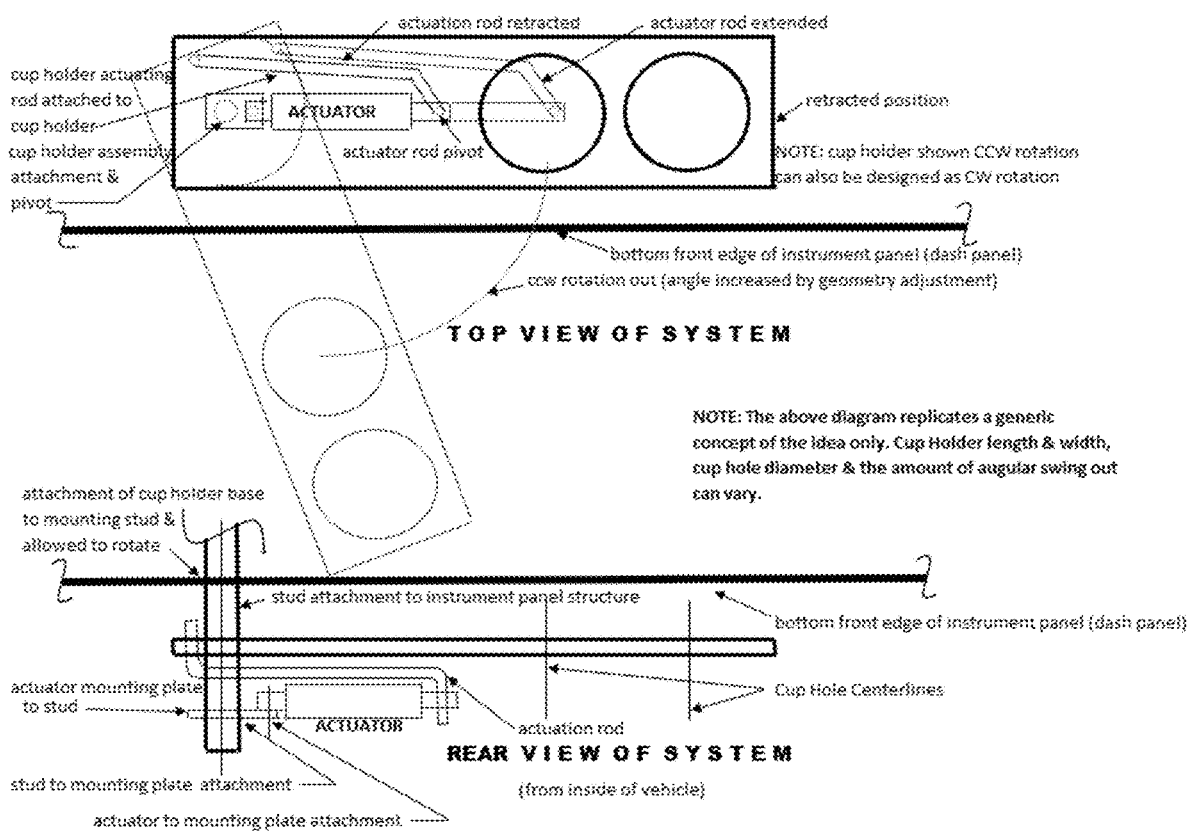
FIG. 2. is a top view and a side (rear) view of the mechanical component operation and component geometry of the invention.
Figure 3:
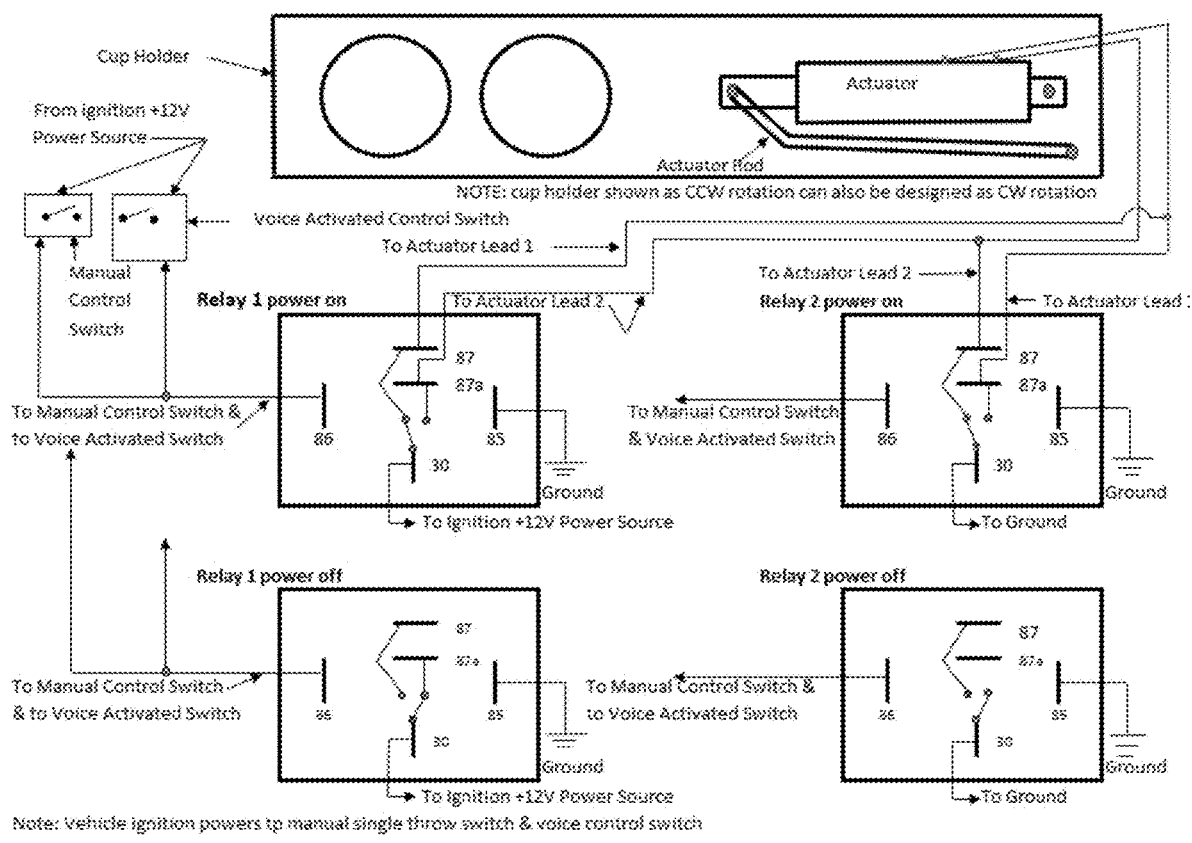
FIG. 3. is a schematic of the electronics necessary to allow the invention to function.
Figure 4:
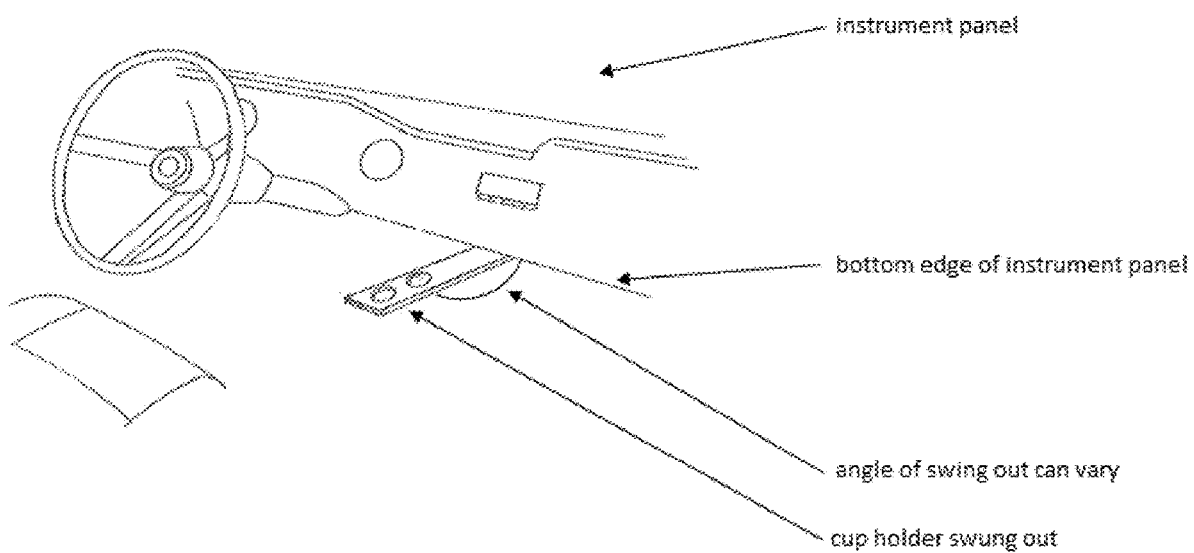
FIG. 4. is an illustration representing the location and operation in an automobile.

According to the present invention, this voice and manually powered retractable cup holder system for a motor vehicle is primarily intended for vintage and antique motor vehicles. The motor vehicle having a support structure comprises the cup holder which is a flat rectangular object (wood, metal, other) which rotates, a linear actuator, an electronically powered switch, an alternately voice activated control switch and a power source. The retractable automobile cup holder further comprises a bracket mounted on vehicle structure which is attached to the linear actuator and cup holder and allows rotation of the cup holder when power is applied. The rotation exposes the cup holder out from under the vehicle instrument panel allowing usage.

The invention claimed is:

1. A cup holder assembly configured to be attached to an instrument panel of a vehicle, the cup holder assembly comprising:
   (a) a cup holder configured to automatically rotate between a first position under the instrument panel of the vehicle and a second position at least partially outward of a bottom front edge of the instrument panel of the vehicle for usage, the cup holder including at least one hole configured to hold at least one cup;
   (b) a stud configured to be attached to the instrument panel of the vehicle, wherein the cup holder is attached to the stud, such that the cup holder is configured to rotate relative to the instrument panel of the vehicle with the stud acting as a pivot;
   (c) a linear actuator attached to the stud, the linear actuator having a first power input wire and a second power input wire, the first power input wire configured to transmit power to the linear actuator for movement of the linear actuator in a first direction, the second power input wire configured to transmit power to the linear actuator for movement of the linear actuator in a second direction;

(d) an actuating rod having a first end coupled to the linear actuator and a second end coupled to the cup holder;

(e) a manually controlled electronic switch coupled to the linear actuator and configured to be mounted under the instrument panel of the vehicle;

(f) a voice activated control module coupled to the linear actuator; and (g) a power source configured to provide a continuous power supply to the manually controlled electronic switch and the voice activated control module.

2. The cup holder assembly according to claim 1, further comprising a mounting plate attaching the linear actuator to the stud.

3. The cup holder assembly according to claim 2, wherein the mounting plate is arranged below the cup holder.

4. The cup holder assembly according to claim 3, wherein the at least one hole of the cup holder comprises a plurality of holes configured to hold a plurality of cups.

5. The cup holder assembly according to claim 4, wherein the cup holder is a flat rectangular object made from wood or metal.

6. The cup holder assembly according to claim 5, wherein, when the cup holder is in the first position, the linear actuator is arranged below the cup holder in a rear view of the cup holder assembly.

7. The cup holder assembly according to claim 6, wherein, upon flipping the manually controlled electronic switch, the cup holder is configured to automatically rotate between the first position and the second position.

8. The cup holder assembly according to claim 7, wherein, upon an activation of the voice activated control module by voice commands, the cup holder is configured to automatically rotate between the first position and the second position.

9. The cup holder assembly according to claim 8, wherein the power source is configured to supply a 6 volts DC power or a 12 volts DC power to the manually controlled electronic switch and the voice activated control module.

10. The cup holder assembly according to claim 9, wherein the cup holder assembly is configured to be attached to the instrument panel of the vehicle without altering the instrument panel of the vehicle, and wherein the cup holder assembly is configured to be removed from the instrument panel without leaving any sign of installation, thereby maintaining authenticity of the vehicle.

11. The cup holder assembly according to claim 1, wherein the at least one hole of the cup holder comprises a plurality of holes configured to hold a plurality of cups.

12. The cup holder assembly according to claim 1, wherein the cup holder is a flat rectangular object.

13. The cup holder assembly according to claim 1, wherein the cup holder is made from wood or metal.

14. The cup holder assembly according to claim 1, wherein, when the cup holder is in the first position, the linear actuator is arranged below the cup holder in a rear view of the cup holder assembly.

15. The cup holder assembly according to claim 1, wherein the cup holder is configured to be retracted in the first position entirely under the instrument panel of the vehicle and inward of the bottom front edge of the instrument panel of the vehicle.

16. The cup holder assembly according to claim 1, wherein the cup holder is configured to rotate from the first position to the second position with the at least one hole arranged outward of the bottom front edge of the instrument panel of the vehicle.

17. The cup holder assembly according to claim 1, wherein, upon flipping the manually controlled electronic switch, the cup holder is configured to automatically rotate between the first position and the second position.

18. The cup holder assembly according to claim 1, wherein, upon an activation of the voice activated control module by voice commands, the cup holder is configured to automatically rotate between the first position and the second position.

19. The cup holder assembly according to claim 1, wherein the power source is configured to supply a 6 volts DC power or a 12 volts DC power to the manually controlled electronic switch and the voice activated control module.

20. The cup holder assembly according to claim 1, wherein the cup holder assembly is configured to be attached to the instrument panel of the vehicle without altering the instrument panel of the vehicle, and wherein the cup holder assembly is configured to be removed from the instrument panel without leaving any sign of installation, thereby maintaining authenticity of the vehicle.

\* \* \* \* \*